US011403706B2

(12) United States Patent
Gross et al.

(10) Patent No.: US 11,403,706 B2
(45) Date of Patent: Aug. 2, 2022

(54) HEADS UP DISPLAY FOR ONLINE WAGERING

(71) Applicant: FAST DOG, LLC, Miami, FL (US)

(72) Inventors: Jeffrey Gross, Boynton Beach, FL (US); Eduardo Burillo, Key Biscayne, FL (US); Steven M. Greenberg, Miami, FL (US)

(73) Assignee: Fast Dog, LLC, Miami, FL (US)

( * ) Notice: Subject to any disclaimer, the term of this patent is extended or adjusted under 35 U.S.C. 154(b) by 139 days.

(21) Appl. No.: 17/092,319

(22) Filed: Nov. 8, 2020

(65) Prior Publication Data
US 2022/0148083 A1    May 12, 2022

(51) Int. Cl.
| | |
|---|---|
| *G06Q 40/04* | (2012.01) |
| *G06Q 50/34* | (2012.01) |
| *G06Q 20/12* | (2012.01) |
| *G06Q 50/00* | (2012.01) |
| *G06F 3/16* | (2006.01) |
| *G07F 17/32* | (2006.01) |
| *G06T 11/00* | (2006.01) |
| *H04L 51/046* | (2022.01) |

(Continued)

(52) U.S. Cl.
CPC ........... *G06Q 40/04* (2013.01); *G06F 3/0482* (2013.01); *G06F 3/167* (2013.01); *G06Q 20/127* (2013.01); *G06Q 30/08* (2013.01); *G06Q 50/01* (2013.01); *G06Q 50/34* (2013.01); *G06T 11/00* (2013.01); *G07F 17/323* (2013.01); *H04L 51/046* (2013.01)

(58) Field of Classification Search
CPC ...... G06Q 40/04; G06Q 20/127; G06Q 30/08; G06Q 50/01; G06Q 50/34; G06F 3/0482; G06F 3/167; G06T 11/00; G07F 17/323; H04L 51/046
See application file for complete search history.

(56) References Cited

U.S. PATENT DOCUMENTS

| | | | |
|---|---|---|---|
| 2014/0302904 A1* | 10/2014 | Cornett | G07F 17/3244 463/16 |
| 2016/0358248 A1* | 12/2016 | LaRocca | G06Q 30/08 |

FOREIGN PATENT DOCUMENTS

| | | | | |
|---|---|---|---|---|
| WO | WO-2018142215 A1 * | 8/2018 | | G06Q 10/101 |

OTHER PUBLICATIONS

Wang et al.: Online Gambling of Pure Chance: Wager Distribution, Risk Attitude, and Anomalous Diffusion, Oct. 11, 2019, Scientific Reports, natureresearch, pp. 1-17. (Year: 2019).*

* cited by examiner

*Primary Examiner* — Bijendra K Shrestha
(74) *Attorney, Agent, or Firm* — Fast Dog, LLC; Steven M. Greenberg

(57) ABSTRACT

Managing the resale of a partial interest in an online wager includes assembling an arrangement of user interface (UI) controls in a UI to an online wagering system tracking multiple online wagers, each having a separate time of purchase odds, a paid price of acquisition and a corresponding owner. The UI is presented in a display of a subscriber to the system and different contemporaneous odds are tracked for each of the wagers. A heads-up display (HUD) is then rendered as a transparent overlay over at least a portion of the UI. The HUD has two user interface controls—an activation button activating a process to transact a partial interest in a selected wager, and a meter showing a time remaining before receiving an outcome for the selected wager, and also a variance between a corresponding one of the contemporaneous odds and time of purchase odds for the selected wager.

12 Claims, 3 Drawing Sheets

(51) Int. Cl.
*G06F 3/0482* (2013.01)
*G06Q 30/08* (2012.01)

HEADS UP DISPLAY FOR ONLINE WAGERING

BACKGROUND OF THE INVENTION

Field of the Invention

The present invention relates to the field of online wagering and more particularly to a real-time display of wager statistics.

Description of the Related Art

Online wagering, also known as online gambling, has existed in several forms for several decades. Generally speaking, online wagering refers to the placement of wagers or bets through a computer interface by way of a remote automated process over a computer communications network such as the global Internet. Online wagering supports many different types of gambling activities including games of chance—particularly card and dice games, online virtual slot machines, pari-mutuel contests and sports wagering. In connection with sports wagering, individual gamblers may directly place bets with a centralized sports book, or the individual gamblers may indirectly place bets through a clearing house in which bets are brokered—so called bet brokering operations.

In general, in the context of sports gambling, a wager is placed in consideration of a cash payment and in connection with a prediction of a specific contingency—an occurrence of an event such as a particular individual or team winning or losing a particular competition, a particular score resulting from a particular competition, or a number or frequency of actions or outcomes that occur during the course of a particular competition. Indeed, sports gambling is not limited to sporting events as wagers likewise can be place on nearly any contest such as a political contest, or an artistic performance. Irrespective of the nature of the contingency of a wager, in most instances, the wager is purchased by the bettor providing funds to the facilitator of the bet, in consequence of which the bettor receives a document, electronic or physical, that specifies the contingency of the wager and the odds associated with the wager.

Of course, to the extent that the wager is placed through a middleman, a small portion of the wager is reserved as a commission for the middleman. Importantly, as it is widely understood, the odds associated with a wager once placed, may change depending upon external circumstances which may influence the probability of the outcome of the wager. As well, the odds associated with a wager may fluctuate depending upon the volume and nature of other wagers placed upon the same criteria by other betters indicating a crowd-sourced mentality of the probability of the associated contingency occurring.

Notably, for a single wager, for most bettors, once the wager has been purchased, no changes are required and the bettor may simply await the outcome to learn of the better has lost the wager, or if the better has won the wager. But, for some wagers, the comfort level of holding particular wagers can vary. To wit, in some instances, a bettor may feel overextended with too many wagers in play, whereas in other instances, the better may lose confidence in a particular wager where the odds have changed for the particular wager since the acquisition of the wager. However, once the wager has been placed, little can be done aside from seeking private secondary market transactions of the complete wager aimed at the sale of the entire wager to a purchaser willing to pay either a premium or a discounted rate for an existing wager depending upon the differential between the odds at the time of acquisition of the wager and the time of re-sale.

To engage in a secondary market transaction, a seller must separately engage in a manual way with a purchaser outside of an online wagering system managing the wagers of the seller. The manual methodologies of doing so include rudimentary methods such as a telephone, or more sophisticated methods such as instant messaging and electronic mail. In all cases, the transaction occurs outside of the online wagering system without the benefit of coordination with the online wagering system and often, deprives the seller of the valuable real-time information present in the online wagering system and the ability to coordinate an optimal sale of an existing wager amongst multiple different bidders. Instead, each transaction derives from sub-optimal, delayed information transacted on a one-on-one basis without the benefit of competitive bidding.

BRIEF SUMMARY OF THE INVENTION

Embodiments of the present invention address deficiencies of the art in respect to online wagering and the resale of an existing wager and provide a novel and non-obvious method, system and computer program product for a heads up display for the partial resale of an online wager. In an embodiment of the invention, a method for managing the resale of a partial interest in an online wager includes assembling an arrangement of user interface controls in a user interface to an online wagering system tracking a multiplicity of online wagers, each wager having a separate time of purchase odds, a paid price of acquisition and a corresponding owner. The method additionally includes displaying the user interface in a display of a subscriber to the online wagering system and tracking different contemporaneous odds for each of the multiplicity of online wagers.

Finally, the method includes rendering an overlay over at least a portion of the user interface. The overlay defines a heads up display including at least two user interface controls. The first user interface control includes an activation button activating a process to transact a partial interest in a selected one of the multiplicity of online wagers. The second user interface control includes a meter showing a time remaining before receiving an outcome for the selected one of the multiplicity of online wagers, and also a variance between a corresponding one of the contemporaneous odds and time of purchase odds for the selected one of the multiplicity of online wagers.

In one aspect of the embodiment, the heads up display further includes a chat user interface control the control comprising program instructions adapted to display chat messages exchanged between the subscriber to the online wagering system and a different subscriber to the online wagering system seeking to transact the partial interest in the selected one of the multiplicity of online wagers.

In another aspect of the embodiment, the heads up display further includes a count of a number of other subscribers to the online wagering system who have set a watch on the selected one of the multiplicity of online wagers, and also a count of a number of the other subscribers to the online wagering system who have placed a bid to acquire a partial interest in the selected one of the multiplicity of online wagers.

In yet another aspect of the embodiment, the heads up display further includes an audio feedback control transforming a magnitude of change in the variance into an audio sound output through the user interface.

In even yet another aspect of the embodiment, the heads up display further includes a history window listing a history of events associated with the selected one of the multiplicity of online wagers and corresponding odds existing at a time of each of the events in the listing.

In another embodiment of the invention, an online wager data processing system is adapted for managing a partial sale of an online wager through a heads up display. The system includes a host computing platform with one or more computers, each having memory and at least one processor. The system also includes an online wagering system managing a multiplicity of online wagers by different subscribers. The management of the wagers includes both tracking the wagers, each having separate time of purchase odds, a paid price of acquisition and a corresponding owner, and also tracking different contemporaneous odds for each of the multiplicity of online wagers. The management of the wagers additionally includes assembling an arrangement of user interface controls in a user interface to the online wagering system and displaying the user interface in a display of a subscriber to the online wagering system.

Finally, the system includes a heads up display module. The module includes computer program instructions enabled while executing in the host computing platform to render an overlay over at least a portion of the user interface. The overlay defines a heads up display including as a first user interface control, an activation button activating a process to transact a partial interest in a selected one of the multiplicity of online wagers, and as a second user interface control, a meter showing a time remaining before receiving an outcome for the selected one of the multiplicity of online wagers, and also a variance between a corresponding one of the contemporaneous odds and time of purchase odds for the selected one of the multiplicity of online wagers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1A:
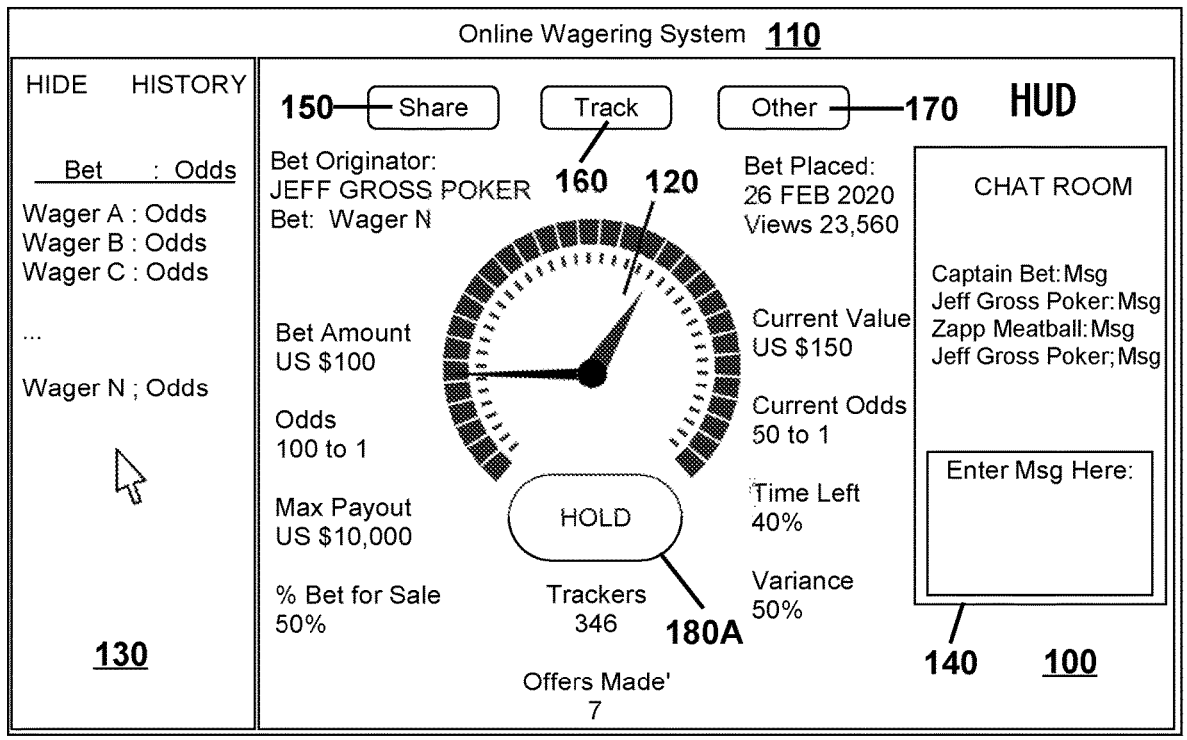
FIGS. 1A through 1D, taken together, are a pictorial illustration of a process for the partial resale of an online wager through a heads up display in an online wagering system.

Embodiments of the invention provide for the partial resale of an online wager through a heads up display to an online wagering system. In accordance with an embodiment of the invention, a set of wagers by different subscribers to an online wagering system are managed within the online wagering system to include the odds at the time of purchase of each of the wagers, an identity of the subscriber and a value of the corresponding one of the wagers. A listing of the wagers may then be presented in a user interface to the online wagering system. One of the wagers in the listing may be selected in response to which an overlay is presented over at least a portion of the user interface. Importantly, the overlay includes a dual dial.

The dual dial indicates on an inner ring of the dial, an amount of time remaining before a contest corresponding to the selected wager expires, and indicating on an outer ring of the dial, a variance between the odds at the time of the purchase of the selected wager and contemporaneous odds of the selected wager. The overlay also includes an activatable button in response to which a dialog box is presented including user interface controls accepting a specification of a partial interest in the selected wager desired to be purchased and an offer amount. Likewise, the overlay includes logic enabled upon activation to respond to a message from a subscriber with an offer for purchase of a partial interest in a wager to accept, reject or initiate a negotiation with the subscriber. In this way, subscribers to the online wagering system can transact dynamically presented offers for partial purchases of wagers without straying from a view to the underlying online wagering system.

In further illustration, FIGS. 1A through 1D, taken together, are a pictorial illustration of a process for the partial resale of an online wager through a heads up display in an online wagering system. In this regard, FIGS. 1A and 1B, taken together, pictorially depict a user interface 110 to an online wagering system including a wager listing 130 of different wagers and corresponding odds. A history of each of the wagers in the wager listing 130 can be viewed in response to a selection of a history control in the wager listing 130, the history retrieving statistics for a selected wager from first acquisition through each re-sale including odds existing at a time of first acquisition and at each re-sale. Of note, the user interface 110 includes a heads up display (HUD) 100.

The HUD 100 includes a dual ring dial 120 indicating at an inner ring, an amount of time remaining in a selected wager in the wager listing 130 before the wager is to be evaluated, and indicating at an outer ring, a variance of odds between contemporaneous odds for the selected wager in the wager listing 130, and odds existing at a last sale of the selected wager in the wager listing 130. As to both the inner ring and the outer ring of the dual ring dial 120, the needle of each ring can move dynamically as the amount of time remaining changes and as the variance of odds changes. Optionally, an audio feedback control (not shown) in the HUD 100 transforms a magnitude of the change in the variance into an audio sound output through the user interface 110 whenever the needle moves on the outer ring.

The HUD 100 also includes a chat room control 140 in which chats can be conducted with different subscribers to the online wagering system. The HUD 100 even further includes a share button control 150 responding to an activation by messaging a reference to the selected wager in the wager listing 130 to one or more subscribers of the online wagering system, a track button control 160 responding to an activation by updating the dual ring dial 120 for a newly selected one of the wagers in the wager listing 130, and an other button control 170 responding to an activation by loading another set of wagers in the wager listing 130 such as a set of wagers associated with a different competition or different sport or different game.

Figure 1B:
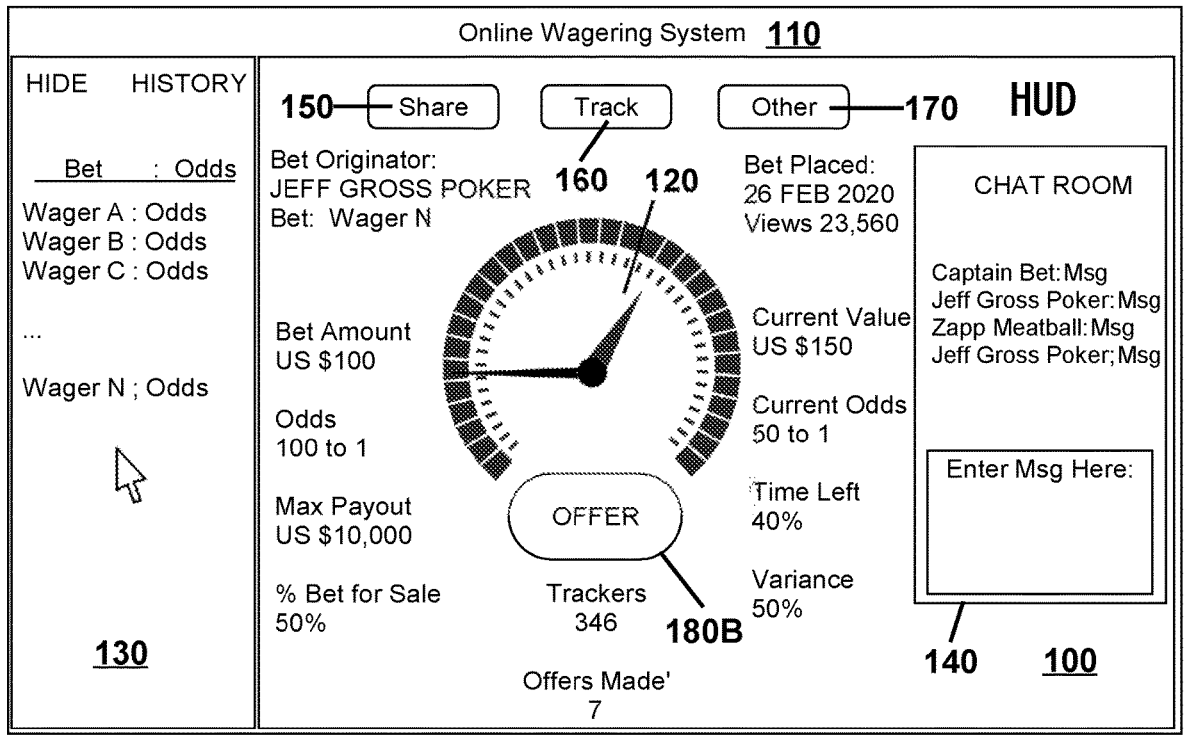

The HUD 100 of FIG. 1A differs from the HUD 100 of FIG. 1B in so far as the HUD 100 of FIG. 1A is disposed within the user interface 110 of a subscriber viewing a selected wager in the wager listing 130 owned by the subscriber. Conversely, the HUD 100 of FIG. 1B is disposed within the user interface 110 of a subscriber viewing a selected wager in the wager listing 130 not owned by the subscriber. In the former instance, a hold button control 180A responds to an activation by holding and not soliciting a sale of the selected wager in the wager listing 130. In the latter instance, an offer button control 180B responds to an activation by initiating a process to offer to purchase a fractional interest in the selected wager in the wager listing 130.

Figure 1C:
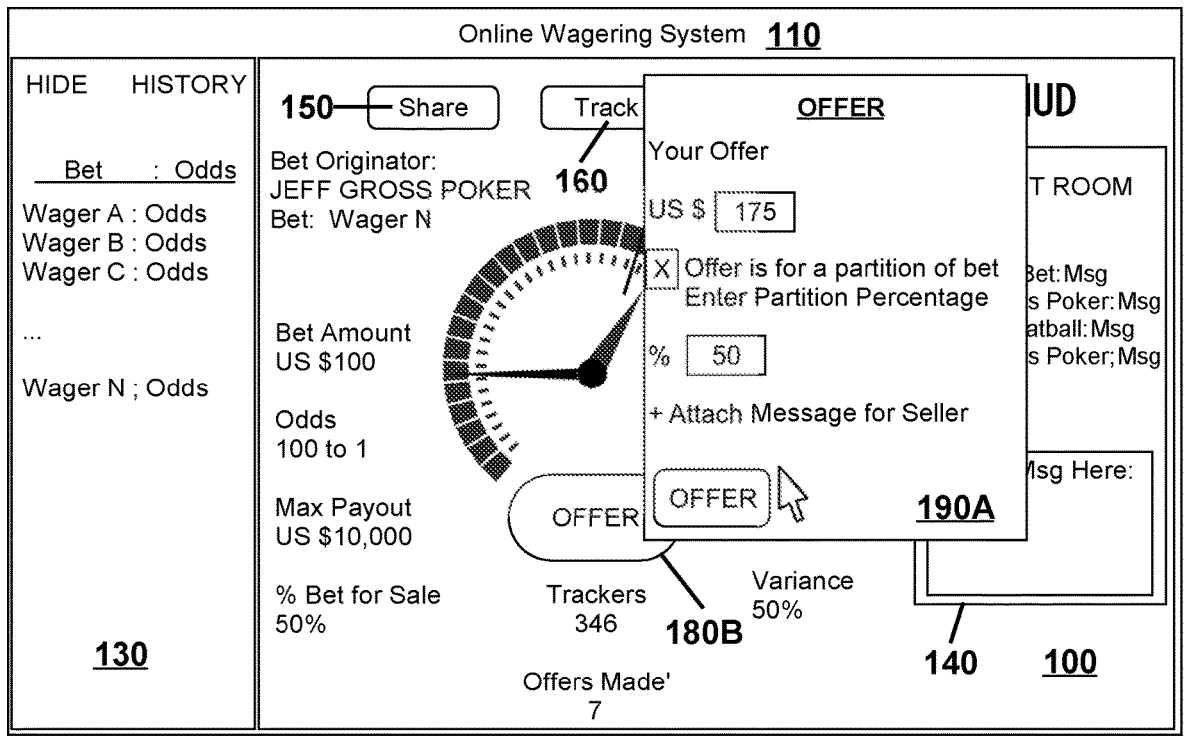
Figure 1D:
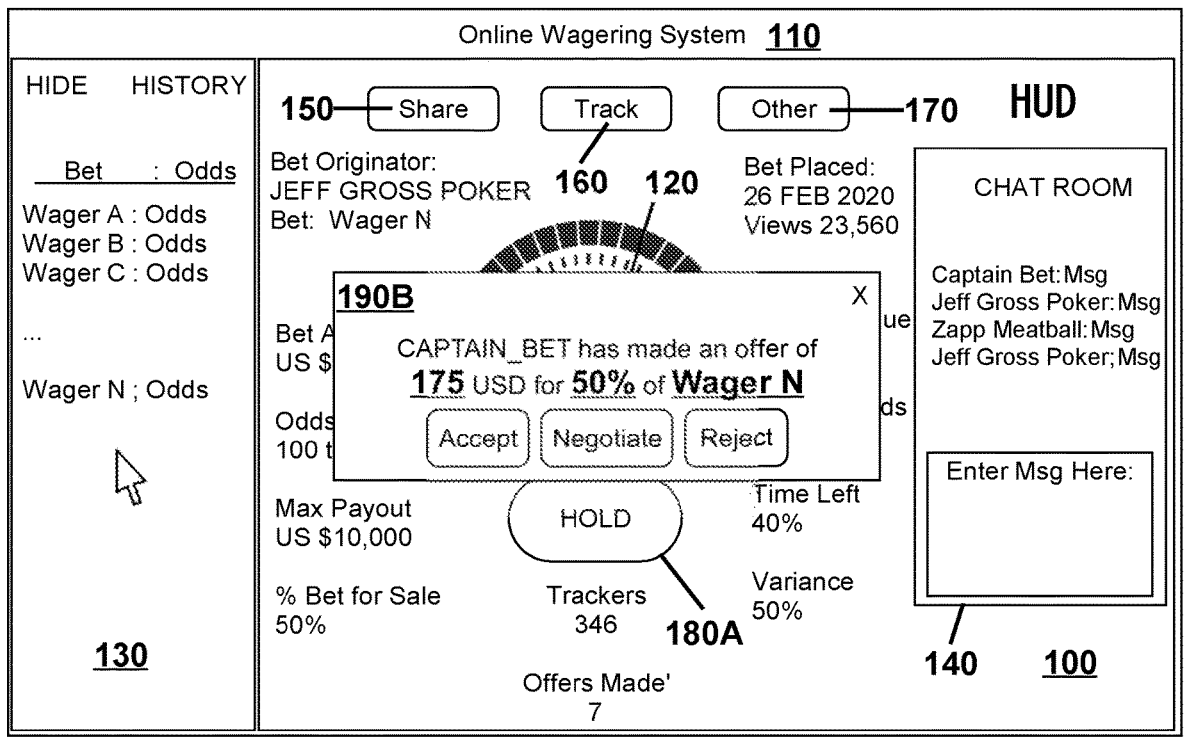

In this regard, referring to FIG. 1C, responsive to an activation of the offer button control 180B, an offer dialog 190A is presented in the HUD 100. The offer dialog 190A accepts a specification by a subscriber of an amount of an offer, and a percentage in the event that the offer is to purchase a fractional interest in the selected wager in the wager listing 130 less than one-hundred percent of the selected wager. Optionally, the offer dialog 190A includes a text entry control in which a message may be input for the seller of the selected wager. Turning now to FIG. 1D, once a message has been received by a selling subscriber from an offering subscriber upon submission of the offer dialog 190A by the offering subscriber, an acceptance dialog 190B is presented in the HUD 100 of the selling subscriber including a specification of the offer of the offer dialog 190A and accept, negotiate and reject button controls responding to an activation thereof by accepting the offer of the offer dialog 190A, rejecting the offer of the offer dialog 190A, or initating a negotiation process with the offering subscriber by messaging the offering subscriber with a counter-offer.

Figure 2:
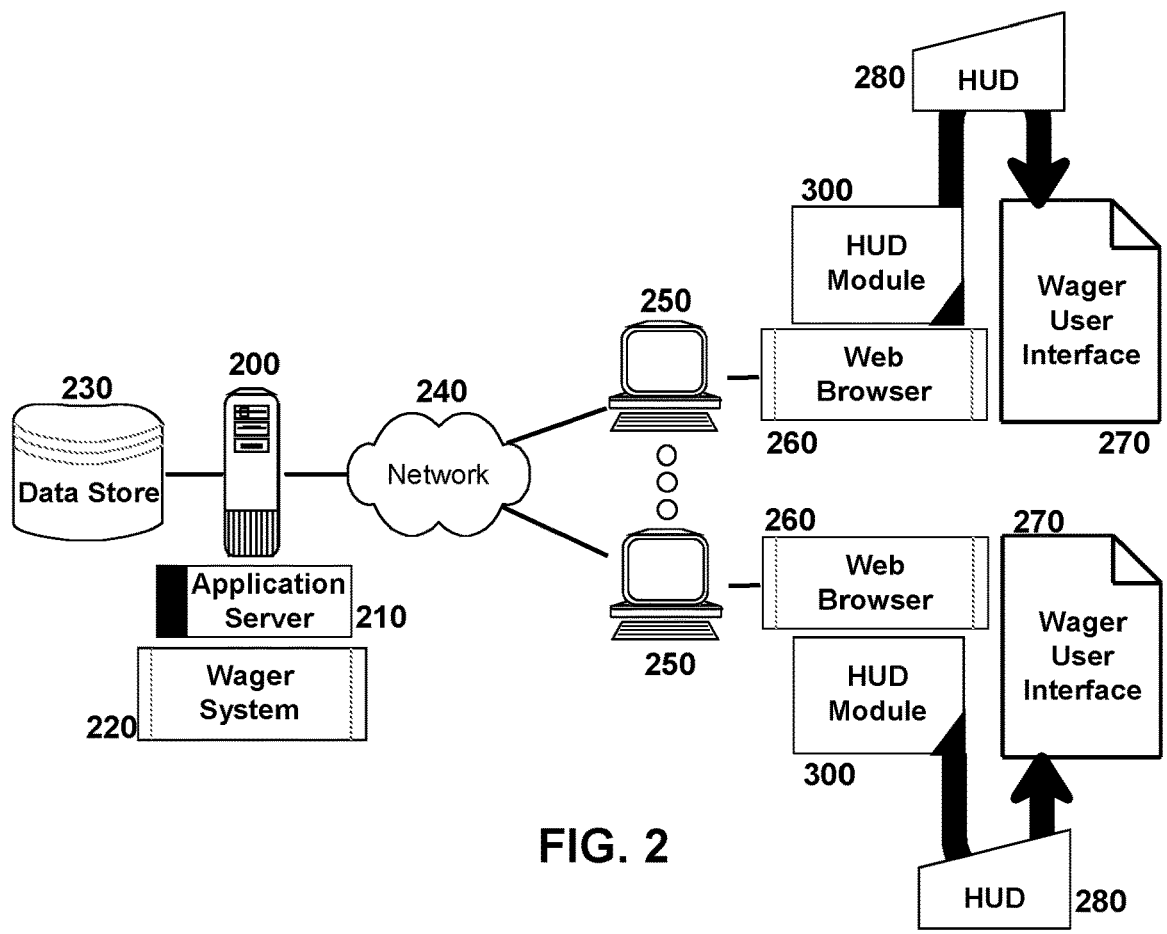
FIG. 2 is a schematic illustration of an online wagering data processing system configured with a heads up display for the partial resale of an online wager; and, FIG. 3 is a flow chart illustrating a process for managing a partial resale of an online wager through a heads up display.

The process described in connection with FIG. 1 can be implemented in a data processing system. In further illustration, FIG. 2 schematically shows an online wagering data processing system configured with a heads up display for the partial resale of an online wager. The system includes a host computing platform 200 including on or more computers, each with memory and at least one processor. The host computing platform 200 hosts the operation of an application server 210 executing logic of an online wagering system 220 to manage different wagers stored in data store 230. Different client computers 250 are communicatively coupled to the host computing platform 200 over computer communications network 240. Each of the client computers includes a Web browser 260 enabled to render different Web pages served by the application server 210 and representing a user interface to the online wagering system 220.

Notably, a HUD module 300 is coupled to the Web browser 260 and may be implemented as a plug-in or extension to the Web browser 260, or may be included as part of a Web page received in the Web browser 260. The HUD module 300 includes computer program instructions enabled upon execution in the memory of the client computers to select a wager included in a wager listing of a user interface 270 in the Web browser 260 reflective of a wager in the data store 230, to generate a dual ring dial for the selected wager within a HUD 280, and to overlay the HUD 280 over the user interface 270. The program instructions of the HUD module 300 further are enabled to respond to a request to generate an offer for a selected wager by rendering an offer dialog and messaging an associated subscriber with the generated offer, and to respond to the receipt of a messaged offer with the rendering of an acceptance dialog.

Figure 3:
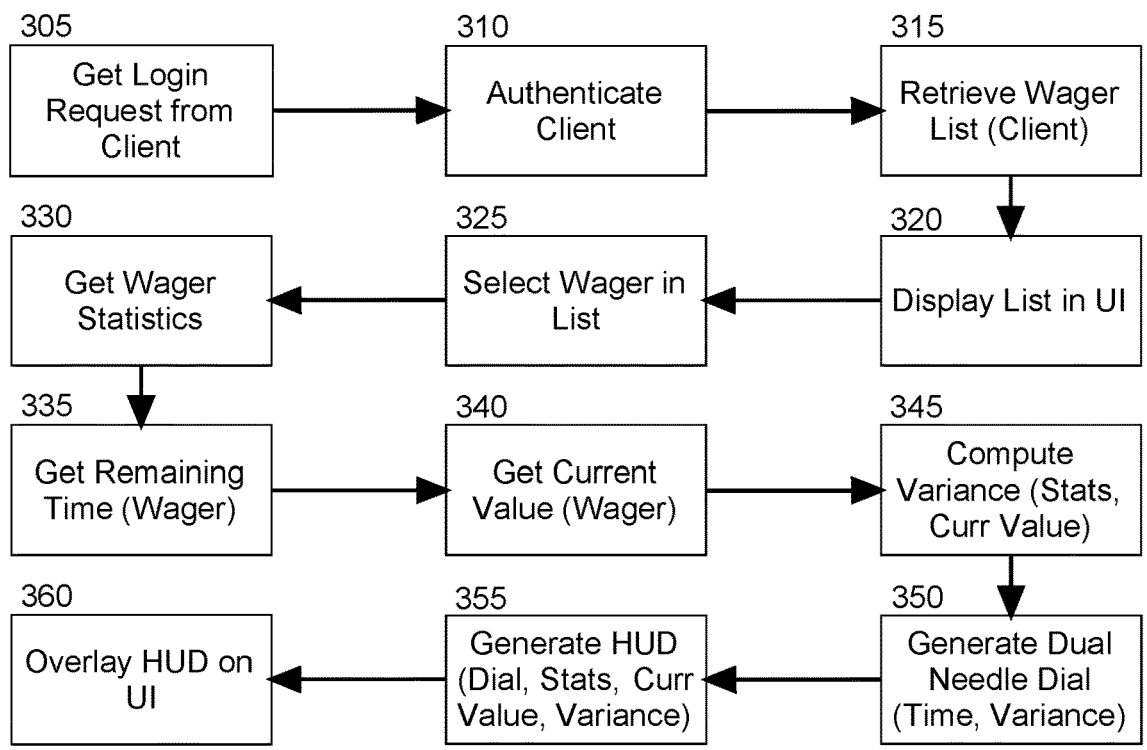

In even yet further illustration of the operation of the HUD module 300, FIG. 3 is a flow chart illustrating a process for managing a partial resale of an online wager through a heads up display. Beginning in block 305, a login request is received from a subscriber to the online wagering system and in block 310, the subscriber is authenticated as a valid user. In block 315, a list of online wagers are retrieved for the subscriber according to a prescribed profile preference. The list can include a list of wagers owned by the subscriber, a list of wagers owned by other subscribers and watched, e.g. monitored, by the subscriber, or a list of wagers associated with a particular competition, contest, sport or game. In block 320, the list is displayed in a user interface to the online wagering system.

In block 325, a particular one of the wagers is selected in the list and in block 330, statistics pertaining to the selected wager are retrieved from the data store, including an identity of an owner (or multiple different owners) of the selected wager, odds of the wager at the time of acquisition by the owner, current odds for the wager and an amount wagered by the owner or owners. In block 335, a remaining time for the wager also is retrieved, such as the remaining time in a competition or contest, or a remaining time in a tournament or season. Then, in block 340 a current value of the wager is determined based upon contemporaneous odds for the selected wager. In block 345, a variance is then computed as between the contemporaneous odds and the odds of the statistics.

In block 350, a dual needle dial is generated reflecting at an inner ring, the amount of time remaining, and at an outer ring, the computed variance. In block 355, a HUD is generated including the dual needle dial, the statistics for the selected wager, a current value of the selected wager and a current value of the variance. Finally, in block 360 the HUD is overlain upon the user interface of the online wagering system. In this way, the subscribers can propose, negotiate and accept a transaction of all or part of an existing wager, without leaving a view to the online wagering system, using contemporaneously accurate information and as between multiple different bidding subscribers in the face of a multiplicity of different possible wagers for purchase.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description; but, is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing the resale of a partial interest in an online wager, the method comprising:
    assembling an arrangement of user interface controls in a user interface to an online wagering system tracking a multiplicity of online wagers, each having separate time of purchase odds, a paid price of acquisition and a corresponding owner;
    displaying the user interface in a display of a subscriber to the online wagering system;
    tracking different contemporaneous odds for each of the multiplicity of online wagers; and,
    rendering an overlay over at least a portion of the user interface, the overlay defining a heads up display including as a first user interface control, an activation button activating a process to transact a partial interest in a selected one of the multiplicity of online wagers, and as a second user interface control, a meter showing a time remaining before receiving an outcome for the selected one of the multiplicity of online wagers, and also a variance between a corresponding one of the contemporaneous odds and time of purchase odds for the selected one of the multiplicity of online wagers,
    wherein the heads up display further includes a chat user interface control the control comprising program instructions adapted to display chat messages exchanged between the subscriber to the online wagering system and a different subscriber to the online wagering system seeking to transact the partial interest in the selected one of the multiplicity of online wagers.

2. The method of claim 1, wherein the heads up display further includes a count of a number of other subscribers to the online wagering system who have set a watch on the selected one of the multiplicity of online wagers, and also a count of a number of the other subscribers to the online wagering system who have placed a bid to acquire a partial interest in the selected one of the multiplicity of online wagers.

3. The method of claim 1, wherein the heads up display further includes an audio feedback control transforming a magnitude of change in the variance into an audio sound output through the user interface.

4. The method of claim 1, wherein the heads up display further includes a history window listing a history of events associated with the selected one of the multiplicity of online wagers and corresponding odds existing at a time of each of the events in the listing.

5. An online wager data processing system adapted for managing a partial sale of an online wager through a heads up display, the system comprising:
- a host computing platform comprising one or more computers, each comprising memory and at least one processor;
- an online wagering system managing a multiplicity of online wagers by different subscribers including tracking the multiplicity of online wagers, each having separate time of purchase odds, a paid price of acquisition and a corresponding owner, tracking different contemporaneous odds for each of the multiplicity of online wagers, assembling an arrangement of user interface controls in a user interface to the online wagering system and displaying the user interface in a display of a subscriber to the online wagering system; and,
- a heads up display module comprising computer program instructions enabled while executing in the host computing platform to render an overlay over at least a portion of the user interface, the overlay defining a heads up display including as a first user interface control, an activation button activating a process to transact a partial interest in a selected one of the multiplicity of online wagers, and as a second user interface control, a meter showing a time remaining before receiving an outcome for the selected one of the multiplicity of online wagers, and also a variance between a corresponding one of the contemporaneous odds and time of purchase odds for the selected one of the multiplicity of online wagers,
- wherein the heads up display further includes a chat user interface control the control comprising program instructions adapted to display chat messages exchanged between the subscriber to the online wagering system and a different subscriber to the online wagering system seeking to transact the partial interest in the selected one of the multiplicity of online wagers.

6. The system of claim 5, wherein the heads up display further includes a count of a number of other subscribers to the online wagering system who have set a watch on the selected one of the multiplicity of online wagers, and also a count of a number of the other subscribers to the online wagering system who have placed a bid to acquire a partial interest in the selected one of the multiplicity of online wagers.

7. The system of claim 5, wherein the heads up display further includes an audio feedback control transforming a magnitude of change in the variance into an audio sound output through the user interface.

8. The system of claim 5, wherein the heads up display further includes a history window listing a history of events associated with the selected one of the multiplicity of online wagers and corresponding odds existing at a time of each of the events in the listing.

9. A computer program product for managing the resale of a partial interest in an online wager, the computer program product including a non-transitory computer readable storage medium having program instructions embodied therewith, the program instructions executable by a device to cause the device to perform steps including:
- assembling an arrangement of user interface controls in a user interface to an online wagering system tracking a multiplicity of online wagers, each having separate time of purchase odds, a paid price of acquisition and a corresponding owner;
- displaying the user interface in a display of a subscriber to the online wagering system;
- tracking different contemporaneous odds for each of the multiplicity of online wagers; and,
- rendering an overlay over at least a portion of the user interface, the overlay defining a heads up display including as a first user interface control, an activation button activating a process to transact a partial interest in a selected one of the multiplicity of online wagers, and as a second user interface control, a meter showing a time remaining before receiving an outcome for the selected one of the multiplicity of online wagers, and also a variance between a corresponding one of the contemporaneous odds and time of purchase odds for the selected one of the multiplicity of online wagers,
- wherein the heads up display further includes a chat user interface control the control comprising program instructions adapted to display chat messages exchanged between the subscriber to the online wagering system and a different subscriber to the online wagering system seeking to transact the partial interest in the selected one of the multiplicity of online wagers.

10. The computer program product of claim 9, wherein the heads up display further includes a count of a number of other subscribers to the online wagering system who have set a watch on the selected one of the multiplicity of online wagers, and also a count of a number of the other subscribers to the online wagering system who have placed a bid to acquire a partial interest in the selected one of the multiplicity of online wagers.

11. The computer program product of claim 9, wherein the heads up display further includes an audio feedback control transforming a magnitude of change in the variance into an audio sound output through the user interface.

12. The computer program product of claim 9, wherein the heads up display further includes a history window listing a history of events associated with the selected one of the multiplicity of online wagers and corresponding odds existing at a time of each of the events in the listing.

\* \* \* \* \*